(12) United States Patent
Gao et al.

(10) Patent No.: US 12,138,802 B1
(45) Date of Patent: Nov. 12, 2024

(54) KINEMATICS MODELING METHOD, APPARATUS AND DEVICE FOR MULTI-DEGREE-OF-FREEDOM MECHANISM AND STORAGE MEDIUM

(71) Applicant: GUANGDONG UNIVERSITY OF TECHNOLOGY, Guangzhou (CN)

(72) Inventors: Jian Gao, Guangzhou (CN); Disai Chen, Guangzhou (CN); Yuheng Luo, Guangzhou (CN); Lanyu Zhang, Guangzhou (CN); Zhuojun Zheng, Guangzhou (CN); Guoqing Wu, Guangzhou (CN); Xin Chen, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/769,309

(22) Filed: Jul. 10, 2024

Related U.S. Application Data

(63) Continuation of application No. PCT/CN2023/122593, filed on Sep. 28, 2023.

(30) Foreign Application Priority Data

Mar. 20, 2023 (CN) .......................... 202310265164.6

(51) Int. Cl.
B25J 9/16 (2006.01)
(52) U.S. Cl.
CPC ........... B25J 9/1664 (2013.01); B25J 9/1607 (2013.01); B25J 9/163 (2013.01)
(58) Field of Classification Search
CPC ........ B25J 9/1664; B25J 9/1607; B25J 9/163; B25J 9/00; B25J 9/16; B25J 9/1692; B25J 9/1628; G06F 17/16; G06F 17/10
See application file for complete search history.

(56) References Cited

U.S. PATENT DOCUMENTS

2011/0218780 A1    9/2011   Yang et al.
2019/0111562 A1    4/2019   Zhou et al.
(Continued)

FOREIGN PATENT DOCUMENTS

CN      108021756 A    5/2018
CN      109895101 A    6/2019
(Continued)

OTHER PUBLICATIONS

M. M. Stanišić et al., "Inverse Velocity and Acceleration Solutions of Serial Robot Arm Subassemblies Using the Canonical Coordinate System," Feb. 1988 (Year: 1988).*
(Continued)

*Primary Examiner* — Adam R Mott
*Assistant Examiner* — Byron Xavier Kasper

(57) ABSTRACT

The present application provides a kinematics modeling method, apparatus and device for a multi-degree-of-freedom mechanism and a storage medium. The method includes: constructing a point coordinate system, and constructing the transformation matrix; constructing transformation matrices of two rotating axes and the transformation matrix; constructing the forward kinematics model based on the transformation matrices of the point coordinate system, the two rotating axes and the workpiece coordinate system; solving the motor value of the rotating axis through the rotation matrix of the end-effector, using the translation matrix of the end-effector as a non-homogeneous linear equation set, solving the motor value of linear axis. Thus solving the technical problem in the prior arts that the redundant parameters are introduced as a cost to separate the linear axis and the rotating axis for step-by-step kinematics calibration, which affects the error calibration precision of the overall end-effector movement of the mechanism.

3 Claims, 5 Drawing Sheets

(56) References Cited

U.S. PATENT DOCUMENTS

2022/0175471 A1* 6/2022 Pickett ............... A61B 34/30
2022/0274255 A1* 9/2022 Okawa ............... B25J 9/1612

FOREIGN PATENT DOCUMENTS

| | | | | |
|---|---|---|---|---|
| CN | 110434851 A | | 11/2019 | |
| CN | 110757450 A | * | 2/2020 | ............... B25J 9/16 |
| CN | 113119126 A | | 7/2021 | |
| CN | 114147720 A | | 3/2022 | |
| CN | 110842914 B | * | 9/2022 | ............ B25J 9/1697 |
| JP | 2023008950 A | | 1/2023 | |

OTHER PUBLICATIONS

Gao Jian et al., "Rapid and Precise Positioning Control of the High-speed Motion Stage", Modular Machine Tool & Automatic Manufacturing Technique, Feb. 20, 2021, pp. 84-91.
Li Hai, "On Kinematics and Path Planning of 6-DOF Manipulator", China Master's Theses Full-text Database, Feb. 15, 2022, pp. 1-92.
Luo yuheng et al., "Kinematic calibration of a symmetric parallel kinematic machine using sensitivity-based iterative planning", Precision engineering journal of the international societies for precision engineering and nanotechnology, Jun. 15, 2022, pp. 164-178.

\* cited by examiner

KINEMATICS MODELING METHOD, APPARATUS AND DEVICE FOR MULTI-DEGREE-OF-FREEDOM MECHANISM AND STORAGE MEDIUM

CROSS REFERENCE

The present disclosure is a continuation-application of International (PCT) Patent Application No. PCT/CN2023/122593, filed on Sep. 28, 2023, which claims priority of Chinese Patent Application No. 202310265164.6, filed on Mar. 20, 2023, the entire contents of which are hereby incorporated by reference in their entirety.

TECHNICAL FIELD

The present application relates to the technical field of kinematics modeling, and particularly to a kinematics modeling method, apparatus and device for a multi-degree-of-freedom mechanism and a storage medium.

BACKGROUND OF THE PRESENT INVENTION

A multi-degree-of-freedom mechanism used for processing a complex curved surface, such as a five-axis machine tool and an industrial robot, has a structural dimension error and an assembly error in a manufacturing process, so as to affect its end-effector positioning accuracy of the mechanism, thus causing a precision loss. Kinematics calibration is a method capable of effectively improving precision of the multi-degree-of-freedom mechanisms, which aims to construct a kinematics model and an error model by introducing error parameters, find out the relationship between end-effector errors and structural errors with the motor driving amount, and finally carry out error compensation according to its inverse kinematics model to improve absolute positioning precision of the mechanism. Because the kinematics model in which the error parameters are introduced is relatively complicated, the inverse kinematics model cannot be analytically solved in existing methods and can only be solved by a time-consuming numerical iteration method, or the inverse kinematics model can be analytically solved at a cost of introducing unnecessary redundant parameters, which destroys the minimality of the model, and leads to the need to separate its linear axis and rotating axis for step-by-step kinematics calibration, thus affecting the error calibration precision of the overall end-effector movement of the mechanism.

SUMMARY OF THE PRESENT INVENTION

The present application provides a kinematics modeling method, apparatus and device for a multi-degree-of-freedom mechanism and a storage medium for improving the technical problem in the prior art that redundant parameters are introduced as a cost to separate its linear axis and rotating axis for step-by-step kinematics calibration, which affects the error calibration precision of the overall movement of the mechanism's end-effector.

In view of this, in a first aspect, the present application provides a kinematics modeling method for a multi-degree-of-freedom mechanism, which includes the following steps of:

using three linear axes of the multi-degree-of-freedom mechanism as a whole to construct a point coordinate system, and constructing a transformation matrix of the point coordinate system based on a homogeneous linear equation set;

respectively constructing transformation matrices of two rotating axes;

constructing a transformation matrix from the end-effector coordinate system of the multi-degree-of-freedom mechanism to a workpiece coordinate system;

constructing a forward kinematics model based on the transformation matrix of the point coordinate system, the transformation matrices of the two rotating axes and the transformation matrix from the end-effector coordinate system to the workpiece coordinate system; and solving a value of a rotating axis motor through a rotation matrix at the end-effector of the multi-degree-of-freedom mechanism by an attitude representation method, using a translation matrix at the end-effector of the multi-degree-of-freedom mechanism as a non-homogeneous linear equation set, and solving the motor values of linear axes through Cramer rule to obtain the inverse kinematics model of the mechanism.

Optionally, the respectively constructing the transformation matrices of the two rotating axes, includes:

when the multi-degree-of-freedom mechanism is a mechanism translated first and then rotated, using three rotation matrices to construct the transformation matrix of the first rotating axis, and determining the transformation matrix of the second rotating axis based on the modeling method; and when the multi-degree-of-freedom mechanism is a mechanism rotated first and then translated, using the three rotation matrices to construct the transformation matrix of the second rotating axis, and determining the transformation matrix of the first rotating axis based on the modeling method.

Optionally, the constructing the forward kinematics model based on the transformation matrix of the point coordinate system, the transformation matrices of the two rotating axes and the transformation matrix from the end-effector coordinate system to the workpiece coordinate system, includes:

when the multi-degree-of-freedom mechanism is the mechanism translated first and then rotated, sequentially subjecting the transformation matrix of the point coordinate system to right multiplication by the transformation matrix of the first rotating axis, the transformation matrix of the second rotating axis and the transformation matrix from the end-effector coordinate system to the workpiece coordinate system to obtain the forward kinematics model; and when the multi-degree-of-freedom mechanism is the mechanism rotated first and then translated, sequentially subjecting the transformation matrix of the point coordinate system to left multiplication by the transformation matrix of the second rotating axis and the transformation matrix of the first rotating axis, and then to right multiplication by the transformation matrix from the end-effector coordinate system to the workpiece coordinate system to obtain the forward kinematics model.

In a second aspect, the present application provides a kinematics modeling apparatus for a multi-degree-of-freedom mechanism, which includes:

a linear axis modeling unit configured for using three linear axes of the multi-degree-of-freedom mechanism as a whole to construct a point coordinate system, and constructing a transformation matrix of the point coordinate system based on a homogeneous linear equation set;

a rotating axis modeling unit configured for respectively constructing transformation matrices of two rotating axes;

a workpiece coordinate system modeling unit configured for constructing a transformation matrix from the end-effector coordinate system of the multi-degree-of-freedom mechanism to a workpiece coordinate system;

the forward kinematics model construction unit configured for constructing a forward kinematics model based on the transformation matrix of the point coordinate system, the transformation matrices of the two rotating axes and the transformation matrix from the end-effector coordinate system to the workpiece coordinate system; and the inverse kinematics model construction unit configured for solving the motor value of rotating axis through a rotation matrix at the end-effector of the multi-degree-of-freedom mechanism by an attitude representation method, using a translation matrix at the end-effector of the multi-degree-of-freedom mechanism as a non-homogeneous linear equation set, and solving the motor values of linear axes through Cramer rule to obtain the inverse kinematics model of the mechanism.

Optionally, the rotating axis modeling unit is specifically configured for:

when the multi-degree-of-freedom mechanism is a mechanism translated first and then rotated, using three rotation matrices to construct a transformation matrix of a first rotating axis, and determining a transformation matrix of a second rotating axis based on the modeling method; and when the multi-degree-of-freedom mechanism is a mechanism rotated first and then translated, using the three rotation matrices to construct the transformation matrix of the second rotating axis, and determining the transformation matrix of the first rotating axis based on the modeling method.

Optionally, the forward kinematics model construction unit is specifically configured for:

when the multi-degree-of-freedom mechanism is the mechanism translated first and then rotated, sequentially subjecting the transformation matrix of the point coordinate system to right multiplication by the transformation matrix of the first rotating axis, the transformation matrix of the second rotating axis and the transformation matrix from the end-effector coordinate system to the workpiece coordinate system to obtain the forward kinematics model; and when the multi-degree-of-freedom mechanism is the mechanism rotated first and then translated, sequentially subjecting the transformation matrix of the point coordinate system to left multiplication by the transformation matrix of the second rotating axis and the transformation matrix of the first rotating axis, and then to right multiplication by the transformation matrix from the end-effector coordinate system to the workpiece coordinate system to obtain the forward kinematics model.

In a third aspect, the present application provides a kinematics modeling device for a multi-degree-of-freedom mechanism, wherein the device includes a processor and a storage;

the storage is used for storing a program code and transmitting the program code to the processor; and the processor is used for executing the kinematics modeling method for the multi-degree-of-freedom mechanism in the first aspect based on an instruction in the program code.

In a fourth aspect, the present application provides a computer-readable storage medium, wherein the computer-readable storage medium is used for storing a program code, and the program code, when executed by a processor, realizes the kinematics modeling method for the multi-degree-of-freedom mechanism in the first aspect.

It can be seen from the technical solution above that the present application has the following advantages:

the present application provides the kinematics modeling method for the multi-degree-of-freedom mechanism, which includes the following steps of: using the three linear axes of the multi-degree-of-freedom mechanism as a whole to construct the point coordinate system, and constructing the transformation matrix of the point coordinate system based on the homogeneous linear equation set; respectively constructing the transformation matrices of the two rotating axes; constructing the transformation matrix from the end-effector coordinate system of the multi-degree-of-freedom mechanism to the workpiece coordinate system; constructing the forward kinematics model based on the transformation matrix of the point coordinate system, the transformation matrices of the two rotating axes and the transformation matrix from the end-effector coordinate system to the workpiece coordinate system; and solving the value of the rotating axis motor through the rotation matrix at the end-effector of the multi-degree-of-freedom mechanism by the attitude representation method, using the translation matrix at the end-effector of the multi-degree-of-freedom mechanism as the non-homogeneous linear equation set, and solving the motor values of the linear axes through Cramer rule to obtain the inverse kinematics model.

In the present application, the linear axis is used as a whole to construct the point coordinate system, the transformation matrix of the point coordinate system is constructed based on the homogeneous linear equation set, the kinematics model is simplified in the case of keeping the minimality of the model, and an analytical solution of the inverse kinematics model is obtained through Cramer rule, and meanwhile, in the present application, redundant parameters are not introduced, and the parameters of the linear axis and the rotating axis have no correlation, so that it is unnecessary to separate the linear axis and the rotating axis, and the linear axis and the rotating axis can be directly used for overall calibration in the case that error parameters of the linear axis and the rotating axis are not affected by each other, thus solving the technical problem in the prior art that the redundant parameters are introduced as a cost to separate the linear axis and the rotating axis for step-by-step kinematics calibration, which affects the error calibration precision of the overall end-effector movement of the mechanism.

DESCRIPTION OF THE DRAWINGS

In order to illustrate technical solutions in embodiments of the present application or in the prior art more clearly, the drawings which need to be used in describing the embodiments or the prior art will be briefly introduced hereinafter. Apparently, the drawings described hereinafter are only some embodiments of the present application, those of ordinary skills in the art may obtain other drawings according to these drawings without going through any creative work.

DETAILED DESCRIPTION OF PREFERRED EMBODIMENTS

Figure 1:
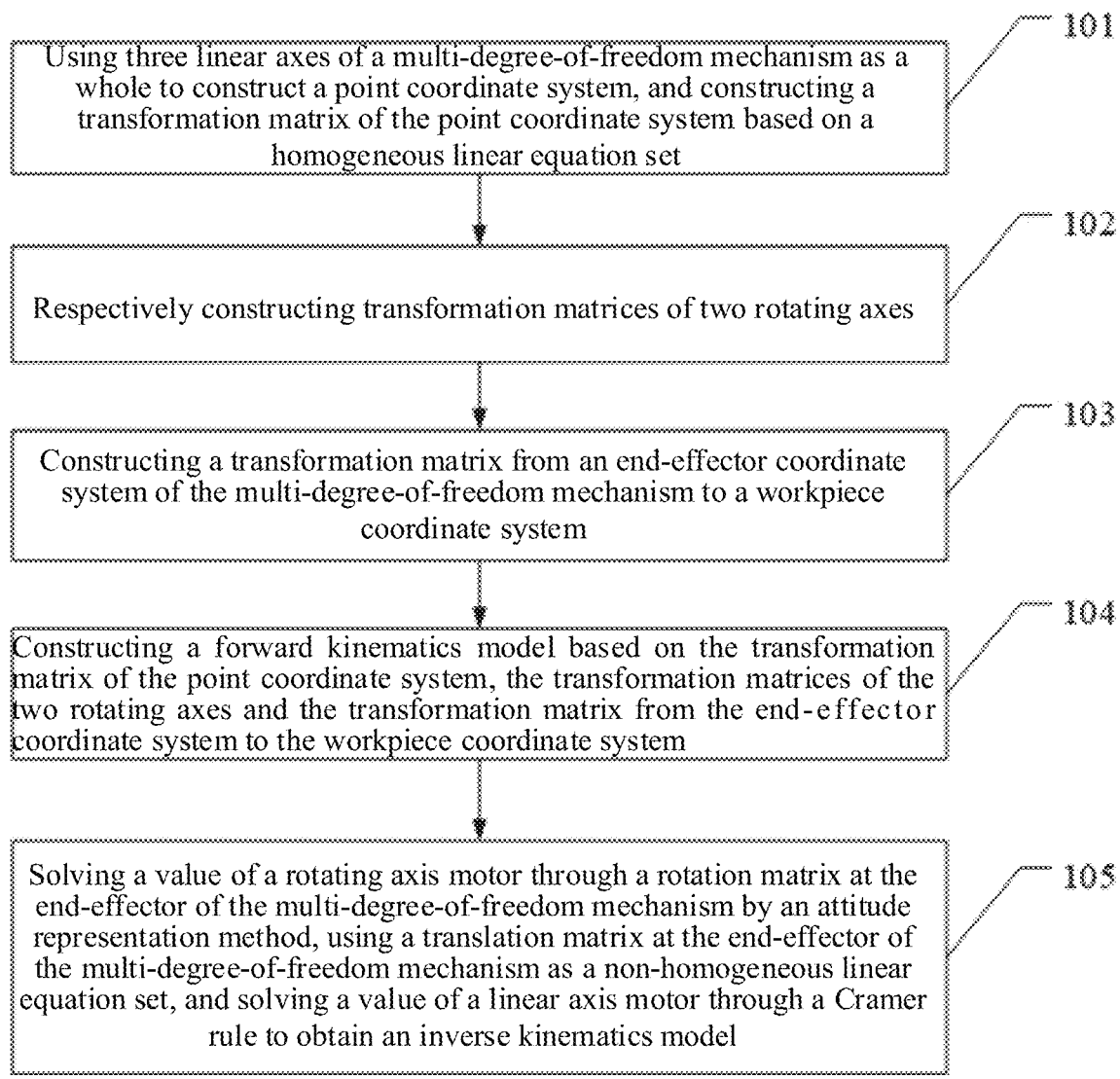
FIG. 1 is a flow chart of a kinematics modeling method for a multi-degree-of-freedom mechanism provided by an embodiment of the present application.

In order to make those skilled in the art better understand the solution of the present application, technical solutions in embodiments of the present application are clearly and completely described with reference to the drawings in the embodiments of the present application. Apparently, the described embodiments are merely some but not all of the embodiments of the present application. Based on the embodiments of the present application, all other embodiments obtained by those of ordinary skills in the art without going through any creative work should fall within the scope of protection of the present application.

In an existing kinematics modeling method, DH (Denavit-Hartenberg), POE (Product of Exponentials Formula), CPC and other methods are usually used for model construction, so that each axis has at least four error parameters. For example, according to a DH model, for an $i^{th}$ axis, each axis contains four parameters, which respectively represent a motion along an x-axis of an $(i-1)^{th}$ coordinate system, a rotation around the x-axis of the $(i-1)^{th}$ coordinate system, a motion along a z-axis of an $i^{th}$ coordinate system and a rotation around the z-axis of the $i^{th}$ coordinate system, and these four movements may be described by matrices $D_x(a_{i-1})$, $R_x(\alpha_{i-1})$, $D_z(d_i)$ and $R_z(\theta_i)$ respectively. Currently, cos is replaced by c and sin is replaced by s, and then this process may be expressed as the following transformation matrix $H_{i-1,i}$, which represents the transmission of movement from an $(i-1)^{th}$ axis to the $i^{th}$ axis:

$$H_{i-1,i} =$$

$$D_x(a_{i-1})R_x(\alpha_{i-1})D_z(d_i)R_z(\theta_i) = \begin{bmatrix} 1 & 0 & 0 & a_{i-1} \\ 0 & 1 & 0 & 0 \\ 0 & 0 & 1 & 0 \\ 0 & 0 & 0 & 1 \end{bmatrix} \begin{bmatrix} 1 & 0 & 0 & 0 \\ 0 & c\alpha_{i-1} & -s\alpha_{i-1} & 0 \\ 0 & s\alpha_{i-1} & c\alpha_{i-1} & 0 \\ 0 & 0 & 0 & 1 \end{bmatrix}$$

$$\begin{bmatrix} 1 & 0 & 0 & 0 \\ 0 & 1 & 0 & 0 \\ 0 & 0 & 1 & d_i \\ 0 & 0 & 0 & 1 \end{bmatrix} \begin{bmatrix} c\theta_i & -s\theta_i & 0 & 0 \\ -s\theta_i & c\theta_i & 0 & 0 \\ 0 & 0 & 1 & 0 \\ 0 & 0 & 0 & 1 \end{bmatrix} = \begin{bmatrix} c\theta_i & -s\theta_i & 0 & a_{i-1} \\ s\theta_i c\alpha_{i-1} & c\theta_i c\alpha_{i-1} & -s\alpha_{i-1} & -s\alpha_{i-1}d_i \\ s\theta_i s\alpha_{i-1} & c\theta_i s\alpha_{i-1} & c\alpha_{i-1} & c\alpha_{i-1}d_i \\ 0 & 0 & 0 & 1 \end{bmatrix}$$

If an object of kinematics calibration is a five-axis machine tool, a kinematics model can only be obtained by multiplying five such transformation matrices, and it is even more difficult to obtain its inverse kinematics model from this complex kinematics model. In order to solve this problem, the kinematics model should be simplified first. In the prior art, a kinematics model of a linear axis is improved, and redundant parameters are introduced as a cost to separate a rotating part and a translating part, which are respectively represented by a rotation matrix and a non-homogeneous linear equation set. However, this requires step-by-step kinematics calibration according to a sequence of linear axes and rotating axes, otherwise the redundant parameters introduced into the linear axis will affect original parameters of the rotating axis, resulting in a poor final calibration effect. Moreover, the end-effector error is a comprehensive influence of all axes, and compared with overall calibration, the step-by-step calibration cannot have a better calibration effect.

In order to solve the problem above, the present application provides a kinematics modeling method for a multi-degree-of-freedom mechanism, which can simplify the kinematics model in the case of keeping the minimality of the model, and obtain an analytical solution of the inverse kinematics model through Cramer rule; and meanwhile, in the method, the redundant parameters are not introduced, and the parameters of the linear axis and the rotating axis have no correlation, so that it is unnecessary to separate the linear axis and the rotating axis, and the linear axis and the rotating axis can be directly used for the overall calibration in the case that error parameters of the linear axis and the rotating axis are not affected by each other.

For easy understanding, with reference to FIG. 1, an embodiment of the present application provides a kinematics modeling method for a multi-degree-of-freedom mechanism, which comprises the following steps.

In step 101, three linear axes of a multi-degree-of-freedom mechanism are used as a whole to construct a point coordinate system, and a transformation matrix of the point coordinate system is constructed based on a homogeneous linear equation set.

Figure 2:
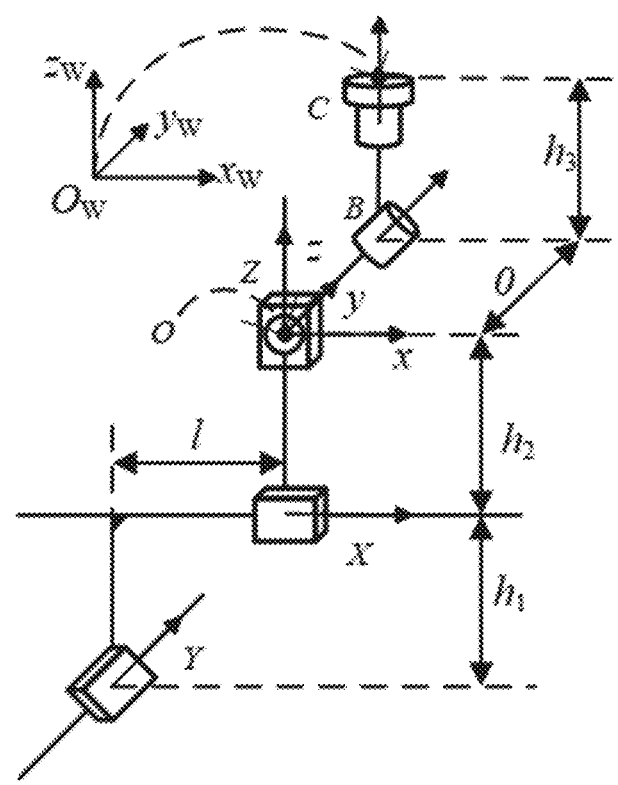
FIG. 2 is a schematic diagram of a kinematics pair of a five-axis machine tool provided by the embodiment of the present application.

In the embodiment of the present application, taking a five-axis machine tool as an example, a schematic diagram of a kinematics pairs of the five-axis machine tool is shown in FIG. 2, and from bottom to top, there are five kinematics pairs, which are respectively a Y-axis motor, an X-axis motor, a Z-axis motor, a B-axis motor and a C-axis motor. An origin O of a global coordinate system O-xyz is selected as an intersection of an axis of the B-axis motor and an axis of the Z-axis motor in an initial state. Although the intersection of the axes of the two motors does not coincide due to a manufacturing error in an actual situation, the axis of the Z-axis motor may be translated to a position intersecting with the axis of the B-axis motor. Because the Z-axis motor and a connector thereof are rigid bodies, and a movement direction of every point on the rigid body is parallel to the axis of the Z-axis motor, the translation operation of the axis may be carried out. A workpiece coordinate system $O_w$-$x_w y_w z_w$ is set at a center of rotation on a surface of the C-axis motor, and the workpiece coordinate system will move with the movement of the machine tool, while the global coordinate system O-xyz will not change.

In the embodiment of the present application, linear axes are integrated into a whole, such as a point, and a coordinate system is placed on the whole, wherein an origin of the coordinate system coincides with an origin of a coordinate system of an adjacent rotating axis in a direction parallel to a base coordinate system, and then the linear equation set is used to describe the movement of the point coordinate system. Specifically, when the kinematics modeling for the multi-degree-of-freedom mechanism is carried out, three linear axes (X-axis, Y-axis and Z-axis) are regarded as a whole, such as a point, the point is always an intersection of the Z-axis and the B-axis, and may move along with the motor in x, y and z directions, and the point has a coordinate system parallel to the global coordinate system, which is the point coordinate system. Therefore, the transformation from the global coordinate system to the point coordinate system only includes translation instead of rotation. Subsequently, the movement of the point in the global coordinate system is expressed by a linear equation set $a_1X+a_2Y+a_3Z$, so that verticality errors of the three linear axes are taken into account. $H_{i,j}$ is used to represent a transformation matrix from the $i^{th}$ axis (coordinate system) to a $j^{th}$ axis (coordinate system), and then the transformation matrix of the point coordinate system is:

$$H_{O,Z} = H_{O,X}H_{X,Y}H_{Y,Z} = \begin{bmatrix} 1 & 0 & 0 & a_{11}X+a_{12}Y+a_{13}Z \\ 0 & 1 & 0 & a_{21}X+a_{22}Y+a_{23}Z \\ 0 & 0 & 1 & a_{31}X+a_{32}Y+a_{33}Z \\ 0 & 0 & 0 & 1 \end{bmatrix};$$

wherein, $H_{O,Z}$ is the transformation matrix of the point coordinate system, $H_{O,X}$ is a transformation matrix from the global coordinate system to the X-axis, $H_{X,Y}$ is a transformation matrix from the X-axis to the Y-axis, $H_{Y,Z}$ is a transformation matrix from the Y-axis to the Z-axis, and $a_{11}, a_{12}, \ldots, a_{32}, a_{33}$ are verticality parameters, with initial values of $$\begin{bmatrix} a_{11} & a_{12} & a_{13} \\ a_{21} & a_{22} & a_{23} \\ a_{31} & a_{32} & a_{33} \end{bmatrix} = \begin{bmatrix} 1 & 0 & 0 \\ 0 & 1 & 0 \\ 0 & 0 & 1 \end{bmatrix}.$$

In step 102, transformation matrices of two rotating axes are respectively constructed.

When the multi-degree-of-freedom mechanism is a mechanism translated first and then rotated, three rotation matrices are used to construct a transformation matrix of a first rotating axis (the B-axis), and a transformation matrix of a second rotating axis (the C-axis) is determined based on the modeling method; and when the multi-degree-of-freedom mechanism is a mechanism rotated first and then translated, the three rotation matrices are used to construct the transformation matrix of the second rotating axis, and the transformation matrix of the first rotating axis is determined based on the modeling method.

Taking the multi-degree-of-freedom mechanism translated first and then rotated as an example, the kinematics model of the linear axis is constructed, and then a kinematics model of a rotating axis is constructed. In the step 101, the rotating part of the linear axis is ignored, which needs to be reflected in the kinematics model of the rotating axis. It should be noted that the point constructed in the step 101 is an origin of the B-axis, because the Z-axis has been moved to a position intersecting with the B-axis. Therefore, there is only rotating transformation from the point coordinate system constructed in the step 101 to a coordinate system of the B-axis motor, and then it is only necessary to ensure that the rotating transformation can be realized. Because a rotation matrix with three parameters can guarantee any rotation, a formula thereof may be directly used when the POE modeling method with three rotation parameters is used. However, if the DH with two rotation parameters is used, an additional rotation matrix around the Y-axis is needed to reflect the rotating part of the linear axis herein. In the embodiment of the present application, an xyz Euler angle may be used to represent a kinematics model of the B-axis motor, which is:

$$H_{Z,B} = R_x(\alpha_Z)R_y(\gamma_{ZB})R_z(\theta_B)$$

$$= \begin{bmatrix} 1 & 0 & 0 & 0 \\ 0 & c\alpha_Z & -s\alpha_Z & 0 \\ 0 & s\alpha_Z & c\alpha_Z & 0 \\ 0 & 0 & 0 & 1 \end{bmatrix} \begin{bmatrix} c\gamma_{ZB} & 0 & s\gamma_{ZB} & 0 \\ 0 & 1 & 0 & 0 \\ -s\gamma_{ZB} & 0 & c\gamma_{ZB} & 0 \\ 0 & 0 & 0 & 1 \end{bmatrix} \begin{bmatrix} c\theta_B & -s\theta_B & 0 & 0 \\ -s\theta_B & c\theta_B & 0 & 0 \\ 0 & 0 & 1 & 0 \\ 0 & 0 & 0 & 1 \end{bmatrix}$$

wherein, $H_{Z,B}$ is a transformation matrix from the Z-axis motor to the B-axis motor, $R_x(\alpha_z)$ is a rotation matrix around an x-axis of a coordinate system of the Z-axis motor, $\alpha_z$ is a corresponding rotation amount, and after rotation, a first new coordinate system is obtained; $R_y(\gamma_{ZB})$ is a rotation matrix around a y-axis of the first new coordinate system, $\delta_{ZB}$ is a corresponding rotation amount, and after rotation, a second new coordinate system is obtained; and $R_z(\theta_B)$ is a rotation matrix around a z-axis of the second new coordinate system, and because the z-axis of the coordinate system is consistent with a z-axis of the coordinate system of the B-axis motor in direction, $R_z(\theta_B)$ is also a rotation matrix around the z-axis of the coordinate system of the B-axis motor, wherein $\alpha_z=-90°$, $\gamma_{ZB}=0°$, $\theta_B=B$, and B is a rotation amount of the B-axis motor. In the embodiment of the present invention, an error of the rotation matrix of the linear axis is transferred to the adjacent rotating axis, so that the transformation of the two coordinate systems only includes the rotating transformation.

After the kinematics models of the first four motor axes are constructed, a kinematics model of a fifth motor axis (the C-axis) may be subsequently constructed by a conventional method, such as the DH method. The kinematics model of the fifth motor axis may be:

$$H_{B,C} = D_x(a_B)R_x(\alpha_B)D_z(d_C)R_z(\theta_C)$$

$$= \begin{bmatrix} 1 & 0 & 0 & a_B \\ 0 & 1 & 0 & 0 \\ 0 & 0 & 1 & 0 \\ 0 & 0 & 0 & 1 \end{bmatrix} \begin{bmatrix} 1 & 0 & 0 & 0 \\ 0 & c\alpha_B & -s\alpha_B & 0 \\ 0 & s\alpha_B & c\alpha_B & 0 \\ 0 & 0 & 0 & 1 \end{bmatrix} \begin{bmatrix} 1 & 0 & 0 & 0 \\ 0 & 1 & 0 & 0 \\ 0 & 0 & 1 & d_C \\ 0 & 0 & 0 & 1 \end{bmatrix}$$

$$\begin{bmatrix} c\theta_C & -s\theta_C & 0 & 0 \\ -s\theta_C & c\theta_C & 0 & 0 \\ 0 & 0 & 1 & 0 \\ 0 & 0 & 0 & 1 \end{bmatrix} = \begin{bmatrix} c\theta_C & -s\theta_i & 0 & a_B \\ s\theta_C c\alpha_B & c\theta_C c\alpha_B & -s\alpha_B & -s\alpha_B d_C \\ s\theta_C s\alpha_B & c\theta_C s\alpha_B & c\alpha_B & c\alpha_B d_C \\ 0 & 0 & 0 & 1 \end{bmatrix}$$

wherein, $H_{B,C}$ is a transformation matrix from the B-axis motor to the C-axis motor, $D_x(a_B)$ is a matrix corresponding to a translation movement along an x-axis of the coordinate system of the B-axis motor, and $a_B$ is a motion amount; $R_x(\alpha_B)$ is a matrix corresponding to a rotation movement around the x-axis of the coordinate system of the B-axis motor, and $\alpha_B$ is a rotation amount; $D_z(d_C)$ is a matrix corresponding to a translation movement along a z-axis of a coordinate system of the C-axis motor, and $d_C$ is a motion amount; and $R_z(\theta_C)$ is a matrix corresponding to a rotation movement around the z-axis of the coordinate system of the C-axis motor, and $\theta_C$ is a rotation amount, wherein $a_B=0$, $\alpha_B=90°$, $d_C=h_3$, $\theta_C=C$, C is a rotation amount of the C-axis motor, and $h_3$ is a distance between an origin of the B-axis motor and an origin of the C-axis motor in the z direction.

When the multi-degree-of-freedom mechanism is the mechanism rotated first and then translated, the kinematics model of the C-axis is constructed first and then the kinematics model of the B-axis is constructed when the kinematics model of the rotating axis is constructed. Specific construction processes of the kinematics model of the C-axis and the kinematics model of the B-axis may refer to the above process, which will not be repeated herein.

In step 103, a transformation matrix from the end-effector coordinate system of the multi-degree-of-freedom mechanism to a workpiece coordinate system is constructed.

After constructing the kinematics models of the five motor axes, a forward kinematics model may be constructed by finally adding the workpiece coordinate system. Because the workpiece coordinate system and the coordinate system of the C-axis motor are parallel, there is only the translation movement, so that a transformation matrix $H_{C,w}$ from the end-effector coordinate system of the multi-degree-of-freedom mechanism to the workpiece coordinate system is:

$$H_{C,w} = \begin{bmatrix} 1 & 0 & 0 & x_w \\ 0 & 1 & 0 & y_w \\ 0 & 0 & 1 & z_w \\ 0 & 0 & 0 & 1 \end{bmatrix};$$

wherein $x_w$, $y_w$ and $z_w$ are coordinate values of an origin $O_w$ of the workpiece coordinate system in the coordinate system of the C-axis motor in the x, y and z directions.

In step 104, the forward kinematics model is constructed based on the transformation matrix of the point coordinate system, the transformation matrices of the two rotating axes and the transformation matrix from the end-effector coordinate system to the workpiece coordinate system.

When the multi-degree-of-freedom mechanism is the mechanism translated first and then rotated, the transformation matrix of the point coordinate system is sequentially subjected to right multiplication by the transformation matrix of the first rotating axis, the transformation matrix of the second rotating axis and the transformation matrix from the end-effector coordinate system to the workpiece coordinate system to obtain the forward kinematics model. Taking the multi-degree-of-freedom mechanism translated first and then rotated as an example, when $\alpha_4=\alpha_Z$, $\gamma_4=\gamma_{ZB}$, $\theta_4=\theta_B$ represent parameters of a fourth coordinate system, because the B-axis motor is the fourth coordinate system according to a sequence of motors from bottom to top, the C-axis motor is a fifth coordinate system, so that $\alpha_5=\alpha_B$, $a_5=a_B$, $\theta_5=\theta_C$, $d_5=d_C$. Finally, the forward kinematics model obtained is as follows:

$$H_{O,w} = H_{O,Z}H_{Z,B}H_{B,C}H_{C,w} = \begin{bmatrix} n_x & o_x & a_x & p_x \\ n_y & o_y & a_y & p_y \\ n_z & o_z & a_z & p_z \\ 0 & 0 & 0 & 1 \end{bmatrix};$$

$n_x = cBcCc\gamma_4 + sCs\alpha_5s\gamma_4 - sBsCc\alpha_5c\gamma_4$ $n_y = cC(sBc\alpha_4 + cBs\alpha_4s\gamma_4) + sCc\alpha_5(cBc\alpha_4 - sBs\alpha_4s\gamma_4) - sCc\gamma_4s\alpha_4s\alpha_5$ $n_z = cC(sBs\alpha_4 - cBc\alpha_4s\gamma_4) + sCc\alpha_5(cBs\alpha_4 + sBc\alpha_4s\gamma_4) + sCc\gamma_4c\alpha_4s\alpha_5$ $o_x = cCs\alpha_5s\gamma_4 - cBsCc\gamma_4 - cCsBc\alpha_5c\gamma_4$ $o_y = cCc\alpha_5(cBc\alpha_4 - sBs\alpha_4s\gamma_4) - sC(sBc\alpha_4 + cBs\alpha_4s\gamma_4) - cCc\gamma_4s\alpha_4s\alpha_5$ $o_z = cCc\alpha_5(cBs\alpha_4 + sBc\alpha_4s\gamma_4) - sC(sBs\alpha_4 - cBc\alpha_4s\gamma_4) + cCc\gamma_4c\alpha_4s\alpha_5$ $a_x = c\alpha_5s\gamma_4 + sBc\gamma_4s\alpha_5$ $a_y = -s\alpha_5(cBc\alpha_4 - sBs\alpha_4s\gamma_4) - c\alpha_5c\gamma_4s\alpha_4$ $a_z = -s\alpha_5(cBs\alpha_4 + sBc\alpha_4s\gamma_4) - c\alpha_5c\gamma_4c\alpha_4$ $p_x = a_{11}X + a_{12}Y + a_{13}Z + b_1$ $p_y = a_{21}X + a_{22}Y + a_{23}Z + b_2$ $p_z = a_{31}X + a_{32}y + a_{33}Z + b_3$ $b_1 = x_w n_x + y_w o_x + (d_5 + z_w)a_x + a_5 cBc\gamma_4$ $b_2 = x_w n_y + y_w o_y + (d_5 + z_w)a_y + a_5(sBc\alpha_4 + cBs\alpha_4s\gamma_4)$ $b_3 = x_w n_z + y_w o_z + (d_5 + z_w)a_z + a_5(sBs\alpha_4 - cBc\alpha_4s\gamma_4)$ wherein, c represents cos and s represents sin.

$$\begin{bmatrix} n_x & o_x & a_x \\ n_y & o_y & a_y \\ n_z & o_z & a_z \end{bmatrix}$$

is a rotation matrix, which is an orthogonal matrix and satisfies a determinant being 1. In $H_{O,w}$, a first column of $$\begin{bmatrix} n_x \\ n_y \\ n_z \end{bmatrix}$$

is a projection of an x-axis of the workpiece coordinate system $O_w$-$x_w y_w z_w$ on the global coordinate system O-xyz, a second column of $$\begin{bmatrix} o_x \\ o_y \\ o_z \end{bmatrix}$$

is a projection of a y-axis of the workpiece coordinate system $O_w$-$x_w y_w z_w$ on the global coordinate system O-xyz, and a third column of $$\begin{bmatrix} a_x \\ a_y \\ a_z \end{bmatrix}$$

is a projection of a z-axis of the workpiece coordinate system $O_w$-$x_w y_w z_w$ on the global coordinate system O-xyz; and $$\begin{bmatrix} p_x \\ p_y \\ p_z \end{bmatrix}$$

are rectangular coordinates of an origin of the workpiece coordinate system $O_w$-$x_w y_w z_w$ on the global coordinate system O-xyz, and $$\begin{bmatrix} b_1 \\ b_2 \\ b_3 \end{bmatrix}$$

are intermediate parameters.

When the multi-degree-of-freedom mechanism is the mechanism rotated first and then translated, the transformation matrix of the point coordinate system is sequentially subjected to left multiplication by the transformation matrix of the second rotating axis and the transformation matrix of the first rotating axis, and then to right multiplication by the transformation matrix from the end-effector coordinate system to the workpiece coordinate system to obtain the forward kinematics model. When the multi-degree-of-freedom mechanism is the mechanism rotated first and then translated, the transformation matrix of the point coordinate system is sequentially subjected to left multiplication by the transformation matrix of the second rotating axis and the transformation matrix of the first rotating axis, and a modeling sequence of the rotating axes should also be from back to front.

In step 105, a value of a rotating axis motor is solved through a rotation matrix at the end-effector of the multi-degree-of-freedom mechanism by an attitude representation method, a translation matrix at the end-effector of the multi-degree-of-freedom mechanism is used as a non-homogeneous linear equation set, and a value of a linear axis motor is solved through a Cramer rule to obtain an inverse kinematics model.

The forward kinematics model may be constructed through the four steps above, and then the inverse kinematics model needs to be constructed, which requires the inverse derivation of the values of the motors from the results derived in the step 104, which means that, at this time, the 12 values $n_x, n_y \ldots p_y, p_z$ in the forward kinematics model are used as known quantities and the 5 values of the motors are used as unknown quantities. The inverse kinematics model needs to follow a sequence of rotating axes first and then linear axes, because the movement of the linear axis will not affect the rotation of the end-effector, but the movement of the rotating axis will affect the translation of the end-effector. Therefore, it is necessary to start with the rotation matrix at the end-effector to solve the B motor and the C motor, which may be obtained by solving the equation set according to the rotation matrix at the end-effector of the multi-degree-of-freedom mechanism. If an object of attitude is a normal vector, the rotation matrix at the end-effector may be multiplied by a vector to be converted into the normal vector, and then the inverse kinematics model is deduced. This process belongs to the prior art, which will not be repeated herein.

After the rotating axis motor is solved, a value of the rotation matrix may be obtained, and then values of $b_1, b_2, b_3$ in $p_x, p_y, p_z$ in the kinematics model are obtained. At this time, it will be found that the translation matrix at the end-effector is the non-homogeneous linear equation set, with independent variables of X, Y and Z. When $$A = \begin{pmatrix} a_{11} & a_{12} & a_{13} \\ a_{21} & a_{22} & a_{23} \\ a_{31} & a_{32} & a_{33} \end{pmatrix}, \vec{X} = \begin{pmatrix} X \\ Y \\ Z \end{pmatrix} \text{ and } \vec{b} = \begin{pmatrix} p_x - b_1 \\ p_y - b_2 \\ p_z - b_3 \end{pmatrix},$$

motion amounts X, Y and Z of the motor may be obtained through the Cramer rule:

$$X = \frac{\det(A_1)}{\det(A)}, Y = \frac{\det(A_2)}{\det(A)}, Z = \frac{\det(A_3)}{\det(A)};$$

$$\text{wherein, } A_1 = \begin{pmatrix} p_x & -b_1 & a_{12} & a_{13} \\ p_y & -b_2 & a_{22} & a_{23} \\ p_z & -b_3 & a_{32} & a_{33} \end{pmatrix}, A_2 = \begin{pmatrix} a_{11} & p_x & -b_1 & a_{13} \\ a_{21} & p_y & -b_2 & a_{23} \\ a_{31} & p_z & -b_3 & a_{33} \end{pmatrix},$$

$$A_3 = \begin{pmatrix} a_{11} & a_{12} & p_x & -b_1 \\ a_{21} & a_{22} & p_y & -b_2 \\ a_{31} & a_{32} & p_z & -b_3 \end{pmatrix},$$

and det(Matrix) represents a determinant of a corresponding matrix.

The values of the rotating axis motors and the values of the linear axis motors solved according to the rotation matrix at the end-effector of the multi-degree-of-freedom mechanism may be obtained through the process above, so that the inverse kinematics model is constructed.

Figure 3:
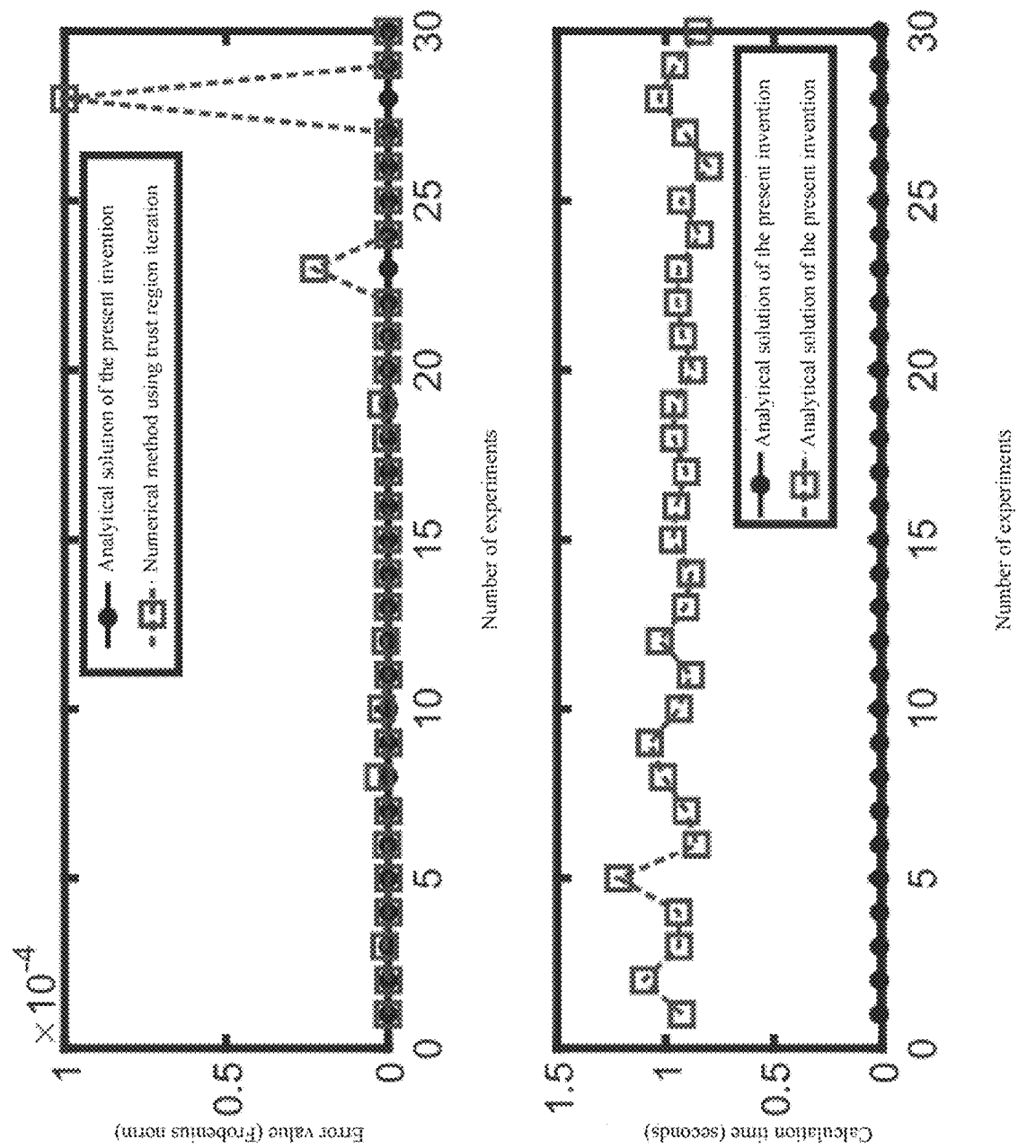
FIG. 3 is a comparison diagram of solution of an inverse kinematics model provided by the embodiment of the present application.

In order to verify the effectiveness of the method proposed in the embodiment of the present application, the inverse kinematics model is simulated for 30 times by using the method proposed in the embodiment of the present application and a numerical iteration method, 100 inverse kinematics models are solved in each simulation, solution errors and calculation time are recorded, and obtained experimental results are shown in FIG. 3. It can be seen from FIG. 3 that the inverse kinematics model of the present application is much higher than that of the numerical method in calculation precision, calculation stability and calculation efficiency.

Figure 4:
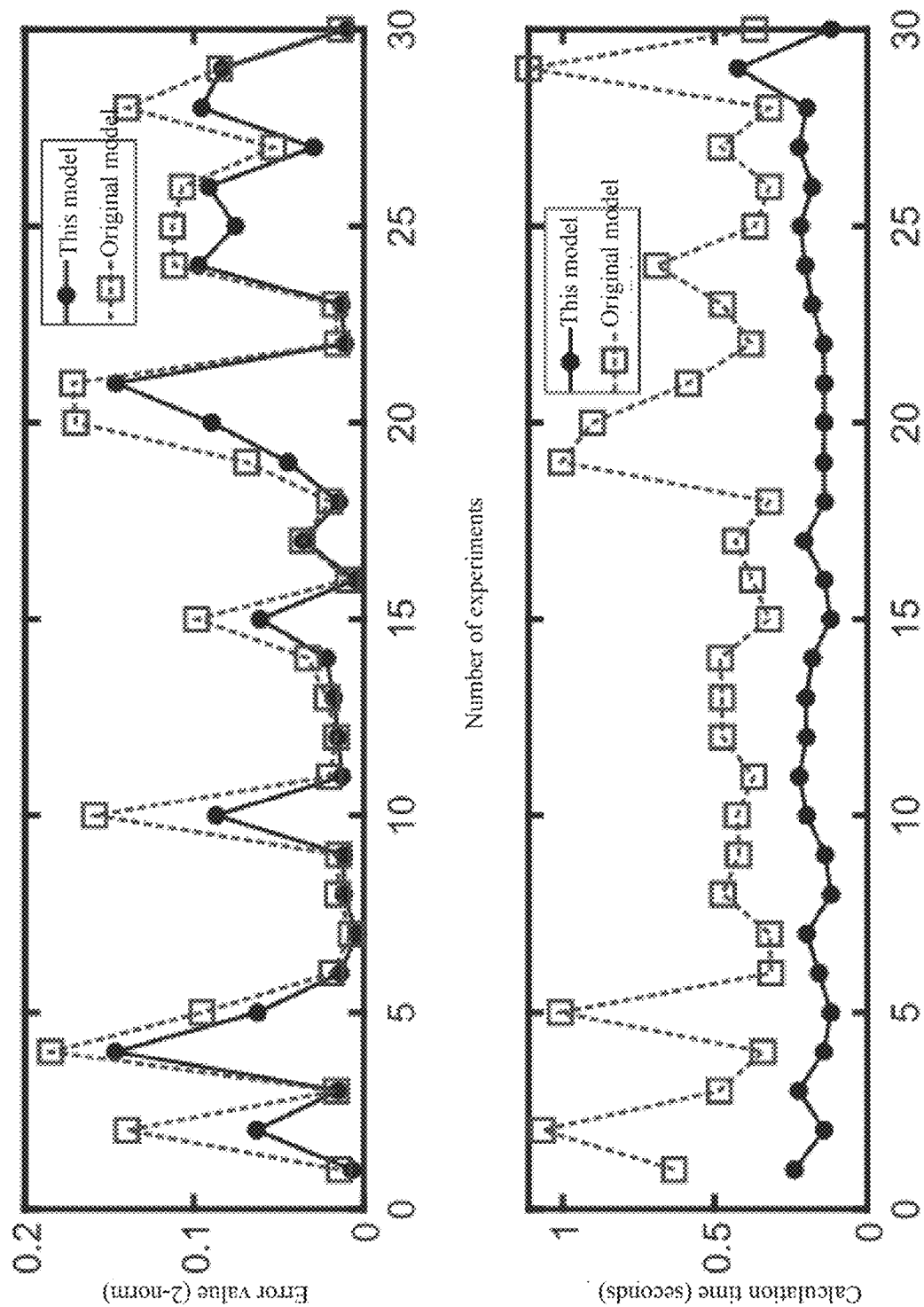
FIG. 4 is a comparison diagram of 2-norm and calculation time of identification error of a forward kinematics model provided by the embodiment of the present application.

As for a difference between an improved forward kinematics model and an original kinematics model, in the embodiment of the present application, a five-axis serial movement platform is taken as a research object, 60 points are actually measured, 15 points are randomly selected for parameter identification each time, identification precision and calculation time are recorded, and obtained identification effects of the model of the present application and the original model are shown in FIG. 4. It can be seen from FIG. 4 that the forward kinematics model of the embodiment of the present application is also higher than the original model in identification precision and calculation efficiency, which indicates that the model of the present application optimizes the error parameter representation of the original model while keeping the minimality of the original model. In the method proposed in the embodiment of the present application, the kinematics model can be simplified without introducing the redundant parameters, which can also ensure the minimality of the model. Because each parameter is independently identifiable, there is no need for step-by-step calibration, and the multi-degree-of-freedom mechanism may be directly calibrated as a whole, which can better reflect a comprehensive influence of an error of each axis on the end-effector error.

In the embodiment of the present application, the linear axis is used as a whole to construct the point coordinate system, the transformation matrix of the point coordinate system is constructed based on the homogeneous linear equation set, the kinematics model is simplified in the case of keeping the minimality of the model, and an analytical solution of the inverse kinematics model is obtained through Cramer rule, and meanwhile, in the present application, the redundant parameters are not introduced, and the parameters of the linear axis and the rotating axis have no correlation, so that it is unnecessary to separate the linear axis and the rotating axis, and the linear axis and the rotating axis can be directly used for overall calibration in the case that error parameters of the linear axis and the rotating axis are not affected by each other, thus improving the technical problem in the prior art that the redundant parameters are introduced as a cost to separate the linear axis and the rotating axis for step-by-step kinematics calibration, which affects the error calibration precision of the overall movement of the end-effector of the mechanism.

The above is one embodiment of the kinematics modeling method for the multi-degree-of-freedom mechanism provided by the present application, and the following is one embodiment of a kinematics modeling apparatus for a multi-degree-of-freedom mechanism provided by the present application.

Figure 5:
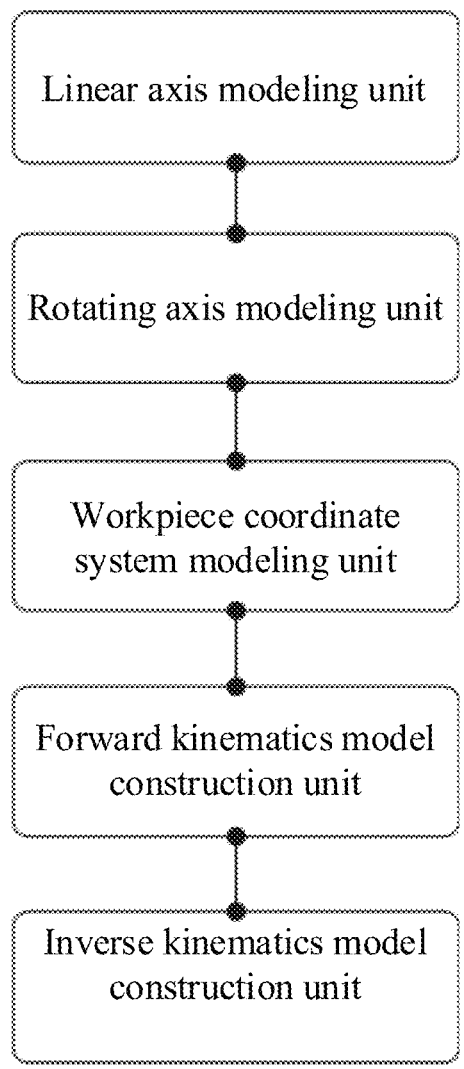
FIG. 5 is a schematic structural diagram of a kinematics modeling apparatus for a multi-degree-of-freedom mechanism provided by an embodiment of the present application.

With reference to FIG. 5, the kinematics modeling apparatus for the multi-degree-of-freedom mechanism provided by the embodiment of the present application includes:

a linear axis modeling unit configured for using three linear axes of the multi-degree-of-freedom mechanism as a whole to construct a point coordinate system, and constructing a transformation matrix of the point coordinate system based on a homogeneous linear equation set;

a rotating axis modeling unit configured for respectively constructing transformation matrices of two rotating axes;

a workpiece coordinate system modeling unit configured for constructing a transformation matrix from the end-effector coordinate system of the multi-degree-of-freedom mechanism to a workpiece coordinate system;

a forward kinematics model construction unit configured for constructing a forward kinematics model based on the transformation matrix of the point coordinate system, the transformation matrices of the two rotating axes and the transformation matrix from the end-effector coordinate system to the workpiece coordinate system; and an inverse kinematics model construction unit configured for solving a value of a rotating axis motor through a rotation matrix at the end-effector of the multi-degree-of-freedom mechanism by an attitude representation method, using a translation matrix at the end-effector of the multi-degree-of-freedom mechanism as a non-homogeneous linear equation set, and solving a value of a linear axis motor through a Cramer rule to obtain an inverse kinematics model.

As a further improvement, the rotating axis modeling unit is specifically configured for:

when the multi-degree-of-freedom mechanism is a mechanism translated first and then rotated, using three rotation matrices to construct a transformation matrix of a first rotating axis, and determining a transformation matrix of a second rotating axis based on the modeling method; and when the multi-degree-of-freedom mechanism is a mechanism rotated first and then translated, using the three rotation matrices to construct the transformation matrix of the second rotating axis, and determining the transformation matrix of the first rotating axis based on the modeling method.

As a further improvement, the forward kinematics model construction unit is specifically configured for:

when the multi-degree-of-freedom mechanism is the mechanism translated first and then rotated, sequentially subjecting the transformation matrix of the point coordinate system to right multiplication by the transformation matrix of the first rotating axis, the transformation matrix of the second rotating axis and the transformation matrix from the end-effector coordinate system to the workpiece coordinate system to obtain the forward kinematics model; and when the multi-degree-of-freedom mechanism is the mechanism rotated first and then translated, sequentially subjecting the transformation matrix of the point coordinate system to left multiplication by the transformation matrix of the second rotating axis and the transformation matrix of the first rotating axis, and then to right multiplication by the transformation matrix from the end-effector coordinate system to the workpiece coordinate system to obtain the forward kinematics model.

In the embodiment of the present application, the linear axis is used as a whole to construct the point coordinate system, the transformation matrix of the point coordinate system is constructed based on the homogeneous linear equation set, the kinematics model is simplified in the case of keeping the minimality of the model, and an analytical solution of the inverse kinematics model is obtained through the Cramer rule, and meanwhile, in the present application, the redundant parameters are not introduced, and the parameters of the linear axis and the rotating axis have no correlation, so that it is unnecessary to separate the linear axis and the rotating axis, and the linear axis and the rotating axis can be directly used for overall calibration in the case that error parameters of the linear axis and the rotating axis are not affected by each other, thus improving the technical problem in the prior art that the redundant parameters are introduced as a cost to separate the linear axis and the rotating axis for step-by-step kinematics calibration, which affects the error calibration precision of the overall movement of the end-effector of the mechanism.

The embodiment of the present application further provides a kinematics modeling device for a multi-degree-of-freedom mechanism, wherein the device includes a processor and a storage;

the storage is used for storing a program code and transmitting the program code to the processor; and the processor is used for executing the kinematics modeling method for the multi-degree-of-freedom mechanism in the method embodiment above based on an instruction in the program code.

The embodiment of the present application further provides a computer-readable storage medium, wherein the computer-readable storage medium is used for storing a program code, and the program code, when executed by a processor, realizes the kinematics modeling method for the multi-degree-of-freedom mechanism in the method embodiment above.

It can be clearly understood by those skilled in the art that, for the sake of convenience and brevity in description, a detailed working process of the foregoing apparatus and unit may refer to a corresponding process in the foregoing method embodiments, and will not be elaborated herein.

The terms "first", "second", "third", "fourth", and the like (if any) in the specification and the drawings of the present application above are used to distinguish similar objects, and are not necessarily used to describe a specific order or sequence. It should be understood that data used in this way may be interchanged under appropriate circumstances, so that the embodiments of the present application described herein can be implemented in a sequence other than those illustrated or described herein. In addition, the terms "comprising", "having" and any variations thereof are intended to cover non-exclusive inclusion. For example, a process, method, system, product or device comprising a series of steps or units is not necessarily limited to those steps or units clearly listed, but may include other steps or units not clearly listed in or inherent to the process, method, product or device.

It should be understood that, in the present application, "at least one (item)" refers to being one or more, and "multiple" refers to being two or more. "And/or" is used for describing the relationship between related objects, and indicates that there may be three relationships. For example, "A and/or B" may indicate that: A exists alone, B exists alone, and A and B exist at the same time, wherein A and B may be singular or plural. The symbol "/" generally indicates that there is a relationship of "or" between the related objects. "At least one (item) of the followings" or similar expression thereof refers to any combination of these items, comprising a singular (item) or any combination of plural (items). For example, at least one (item) of a, b or c may indicate: a, b, c, "a and b", "a and c", "b and c", or "a and b and c", wherein a, b and c may be singular or plural.

In the several embodiments provided in the present application, it should be understood that the disclosed apparatus and method may be implemented in other ways. For example, the foregoing apparatus embodiments are only illustrative. For example, the division of the units is only one logical function division. In practice, there may be other division methods. For example, multiple units or assemblies may be combined or integrated into another system, or some features may be ignored or not executed. In addition, the illustrated or discussed mutual coupling or direct coupling or communication connection may be indirect coupling or communication connection through some interfaces, devices or units, and may be in electrical, mechanical or other forms.

The units illustrated as separated parts may be or not be physically separated, and the parts displayed as units may be or not be physical units, which means that the parts may be located in one place or distributed on multiple network units. Some or all of the units may be selected according to actual needs to achieve the objects of the solutions of the embodiments.

In addition, each functional unit in each embodiment of the present application may be integrated in one processing unit, or each unit may exist alone physically, or two or more units may be integrated in one unit. The integrated units above may be implemented in a form of hardware, or may be implemented in a form of software functional unit.

The integrated units, if being implemented in the form of software functional unit and taken as an independent product to sell or use, may also be stored in one computer-readable storage medium. Based on such understanding, the essence of the technical solution of the present application, or a part contributing to the prior art, or all or a part of the technical solution may be embodied in a form of software product. The computer software product is stored in one storage medium including a number of instructions such that a computer device (which may be a personal computer, a server, or a network device, etc.) executes all or a part of steps of the method in the embodiments of the present application. Moreover, the foregoing storage medium includes: various media capable of storing the program code, such as a USB disk, a mobile hard disk, a Read-Only Memory (ROM), a Random Access Memory (RAM), a non-transitory computer-readable storage medium, a magnetic disk or an optical disk.

As described above, the embodiments above are only used to illustrate the technical solutions of the present application, and are not intended to limit the present application. Although the present application has been described in detail with reference to the above-mentioned embodiments, those of ordinary skills in the art should understand that: the technical solution recorded in the above-mentioned embodiments can still be modified, or equivalent substitutions can be made to a part of the technical features in the embodiments. However, these modifications or substitutions should not depart from the spirit and scope of the technical solution of the embodiments of the present application.

We claim:

1. A kinematics modeling method for a multi-degree-of-freedom mechanism, comprising the following steps of:
   using three linear axes of the multi-degree-of-freedom mechanism as a whole to construct a point coordinate system, and constructing a transformation matrix of the point coordinate system based on a homogeneous linear equation set;
   respectively constructing transformation matrices of two rotating axes;
   constructing a transformation matrix from an end-effector coordinate system of the multi-degree-of-freedom mechanism to a workpiece coordinate system;
   constructing a forward kinematics model based on the transformation matrix of the point coordinate system, the transformation matrices of the two rotating axes and the transformation matrix from the end-effector coordinate system to the workpiece coordinate system; and
   solving a value of a rotating axis motor through a rotation matrix at the end-effector of the multi-degree-of-freedom mechanism by an attitude representation method, using a translation matrix at the end-effector of the multi-degree-of-freedom mechanism as a non-homogeneous linear equation set, and solving a value of a linear axis motor through a Cramer rule to obtain an inverse kinematics model; wherein,
   the using the three linear axes of the multi-degree-of-freedom mechanism as a whole to construct the point coordinate system, comprises:
   integrating the three linear axes of the multi-degree-of-freedom mechanism into a whole, and placing a coordinate system on the whole, wherein an origin of the coordinate system coincides with an origin of a coordinate system of an adjacent rotating axis in a direction parallel to a base coordinate system;
   the respectively constructing the transformation matrices of the two rotating axes, comprises:
   when the multi-degree-of-freedom mechanism is a mechanism translated first and then rotated, using three rotation matrices to construct a transformation matrix of a first rotating axis, and determining a transformation matrix of a second rotating axis based on the modeling method; and
   when the multi-degree-of-freedom mechanism is a mechanism rotated first and then translated, using the three rotation matrices to construct the transformation matrix of the second rotating axis, and determining the transformation matrix of the first rotating axis based on the modeling method;
   the constructing the forward kinematics model based on the transformation matrix of the point coordinate system, the transformation matrices of the two rotating axes and the transformation matrix from the end-effector coordinate system to the workpiece coordinate system, comprises:

when the multi-degree-of-freedom mechanism is the mechanism translated first and then rotated, sequentially subjecting the transformation matrix of the point coordinate system to right multiplication by the transformation matrix of the first rotating axis, the transformation matrix of the second rotating axis and the transformation matrix from the end-effector coordinate system to the workpiece coordinate system to obtain the forward kinematics model; and when the multi-degree-of-freedom mechanism is the mechanism rotated first and then translated, sequentially subjecting the transformation matrix of the point coordinate system to left multiplication by the transformation matrix of the second rotating axis and the transformation matrix of the first rotating axis, and then to right multiplication by the transformation matrix from the end-effector coordinate system to the workpiece coordinate system to obtain the forward kinematics model.

2. A kinematics modeling device for a multi-degree-of-freedom mechanism, wherein the device comprises a processor and a storage;

the storage is used for storing a program code and transmitting the program code to the processor; and the processor is used for executing the kinematics modeling method for the multi-degree-of-freedom mechanism according to claim 1 based on an instruction in the program code.

3. A non-transitory computer-readable storage medium, wherein the non-transitory computer-readable storage medium is used for storing a program code, and the program code, when executed by a processor, realizes the kinematics modeling method for the multi-degree-of-freedom mechanism according to claim 1.

* * * * *